(12) United States Patent
Abts et al.

(10) Patent No.: US 8,095,759 B2
(45) Date of Patent: Jan. 10, 2012

(54) ERROR MANAGEMENT FIREWALL IN A MULTIPROCESSOR COMPUTER

(75) Inventors: Dennis C. Abts, Eleva, WI (US); Steven L. Scott, Chippewa Falls, WI (US); Aaron F. Godfrey, Eagan, MN (US)

(73) Assignee: Cray Inc., Seattle, WA (US)

( * ) Notice: Subject to any disclaimer, the term of this patent is extended or adjusted under 35 U.S.C. 154(b) by 407 days.

(21) Appl. No.: 12/474,556

(22) Filed: May 29, 2009

(65) Prior Publication Data

US 2010/0306489 A1  Dec. 2, 2010

(51) Int. Cl.
*G06F 12/14* (2006.01)

(52) U.S. Cl. ............... 711/163; 711/E12.091; 712/30; 712/E9.002

(58) Field of Classification Search ............ 711/163, 711/E12.091; 712/30, E9.002
See application file for complete search history.

(56) References Cited

U.S. PATENT DOCUMENTS

| 2007/0135216 A1* | 6/2007 | Martinek et al. ............ 463/29 |
| 2007/0261112 A1* | 11/2007 | Todd et al. ............ 726/11 |
| 2010/0131729 A1* | 5/2010 | Fulcheri et al. ............ 711/163 |

* cited by examiner

*Primary Examiner* — Hoai V Ho
(74) *Attorney, Agent, or Firm* — Schwegman, Lundberg & Woessner, P.A.

(57) ABSTRACT

A multiprocessor computer system comprises a plurality of processors and a plurality of nodes, each node comprising one or more processors. A local memory in each of the plurality of nodes is coupled to the processors in each node, and a hardware firewall comprising a part of one or more of the nodes is operable to prevent a write from an unauthorized processor from writing to the local memory.

15 Claims, 7 Drawing Sheets

Fig.1

| NAME | DESCRIPTION |
|---|---|
| ERROR_FLAGS | EACH ERROR HAS A CORRESPONDING BIT IN THIS REGISTER. FOR EXAMPLE, RcvBuffOverflow = BIT 3 AND SO FORTH. THE BIT IS SET TO 1 WHEN AN ERROR IS DETECTED, AND IT REMAINS SET UNTIL IT IS EXPLICITLY CLEARED BY WRITING A 1 TO THE CORRESPONDING BIT IN THE ERROR_CLEAR REGISTER. |
| ERROR_INFO | ERROR CONTEXT, INCLUDING FIELDS FROM THE PACKET/REFERENCE THAT CAUSED THE ERROR (E.G. PROTECTION TAG, MDH, TID, ETC.) |
| ERROR_MASK | WRITING A 1 TO A BIT IN THIS REGISTER WILL CAUSE THE CORRESPONDING BIT IN THE ERROR_FLAGS REGISTER TO BE IGNORED (MASKED). |
| ERROR_CLEAR | WRITING A 1 TO A BIT IN THIS REGISTER WILL CLEAR THE CORRESPONDING BIT IN THE ERROR_FLAGS REGISTER |
| OS_MASK | SETTING A BIT IN THIS REGISTER WILL CAUSE AN INTERRUPT TO BE GENERATED FOR THE CORRESPONDING BIT IN THE ERROR_FLAGS REGISTER |
| HSS_MASK | SETTING A BIT IN THIS REGISTER WILL CAUSE THE ATTN PIN ON THE GEMINI CHIP TO BE ASSERTED (REQUEST THE ATTENTION OF THE HSS MAINTENENCE SYSTEM) CORRESPONDING BIT IN THE ERROR_FLAGS REGISTER. |

Fig.2

| ENCODING | DESCRIPTION |
|---|---|
| 0000 | NORMAL COMPLETION = OKAY |
| 0001 | MIS-ROUTED PACKET (NODEID[15:0] ? DESTINATION [15:0]) |
| 0010 | UNCORRECTABLE ERROR |
| 0011 | INVALID COMMAND |
| 0100 | MALFORMED PACKET |
| 0101 | UNCORRECTABLE ERROR DURING REMOTE MEMORY TRANSLATION |
| 0110 | INVALID ENTRY IN THE VMDH TABLE |
| 0111 | INVALID ENTRY IN THE MDD TABLE OR MRT |
| 1000 | PROTECTION TAG MISMATCH |
| 1001 | MEMORY BOUNDS ERROR |
| 1010 | WRITE PERMISSIONS ERROR |
| 1011 | ORB TIMEOUT |
| 1100 | UNSOLICITED RESPONSE (NO MATCHING REQUEST IN THE ORB) |
| 1101 | UNUSED |
| 1110 | UNUSED |
| 1111 | UNUSED |

LEGEND

| | |
|---|---|
| | GOOD PACKET |
| | PACKET RECEIVED CANNOT BE TRANSLATED |
| | UNINITIALIZED REMOTE ADDRESS TRANSLATION ENTRY |
| | FAILED REMOTE MEMORY TRANSLATION |
| | ERROR PROCESSING RESPONSE PACKET |
| | UNUSED |

FIREWALL GROUPS

| GROUP | |
|---|---|
| 0 | DEFINED AS LOCAL NODE ONLY |
| 1-4 | ARBITRARY MEMBERSHIP |
| 5-6 | RESERVED |
| 7 | ENTIRE MACHINE |

*Fig. 7*

FIREWALL GROUP GRANULARITIES

| SYSTEM SIZE | MEMBERSHIP GRANULARITY | SOURCE PROC BITS CORRESPONDING TO MEMBERSHIP BIT-VECTOR |
|---|---|---|
| 1 TO 2048 | ONE PROC | SOURCE [10..0] |
| 2049 TO 4096 | TWO PROCS | SOURCE [11..1] |
| 4097 TO 8192 | FOUR PROCS | SOURCE [12..2] |
| 8193 TO 16384 | EIGHT PROCS | SOURCE [13..3] |
| 16385 TO 32768 | SIXTEEN PROCS | SOURCE [14..4] |

*Fig. 8*

ERROR MANAGEMENT FIREWALL IN A MULTIPROCESSOR COMPUTER

FIELD OF THE INVENTION

The invention relates generally to multiprocessor computer systems, and more specifically to an error management firewall in a multiprocessor computer system.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data instructions.

In more sophisticated computer systems, multiple processors are used, and one or more processors runs software that is operable to assign tasks to other processors or to split up a task so that it can be worked on by multiple processors at the same time. In such systems, the data being worked on is typically stored in memory that is either centralized, or is split up among the different processors working on a task.

Volatile memory, such as the dynamic random access memory (DRAM) most commonly found in computers, is able to store data such that it can be read or written much more quickly than the same data could be accessed using nonvolatile storage such as a hard disk drive or flash nonvolatile memory. Volatile memory loses its content when power is cut off, so while it is generally not useful for long-term storage it is typically used for temporary storage of data while a computer is running.

A typical random-access memory consists of an array of transistors or switches coupled to capacitors, where the transistors are used to switch a capacitor into or out of a circuit for reading or writing a value stored in the capacitive element. These storage bits are typically arranged in an array of rows and columns, and are accessed by specifying a memory address that contains or is decoded to find the row and column of the memory bit to be accessed.

The memory in a computer usually takes the form of a network of such circuit elements formed on an integrated circuit, or chip. Several integrated circuits are typically mounted to a single small printed circuit board to form a memory module, such as single inline memory modules (SIMMs) having a 32-bit memory channel for reading and writing data, or dual inline memory modules (DIMMs) having a 64-bit memory channel. Some more sophisticated types of memory modules include synchronous dynamic random access memory, or SDRAM, which runs in synchronization with the computer's bus, and double data rate (DDR) SDRAM or DDR2 SDRAM, which transfer data on both the rising and falling edges of the clock and have memory channel widths up to 64 bits of data and 8 bits of error management information per memory transfer. The memory chips are sometimes located centrally in multiprocessor computer systems, but are more typically divided among the various processors or system boards that make up the multiprocessor computer system.

Improvements in semiconductor technology over time include making memory chips and other digital logic chips smaller, faster, and operable to consume less power and therefore to generate less heat. But, the constant push to improve semiconductor performance and the imperfect nature of manufactured goods in general suggest that occasional flaws or imperfections will occur. Individual memory bit locations occasionally go bad, and sometimes even whole memory chips fail. It is also known that various electrical phenomena can regularly cause memory read or write errors or digital logic errors, such as electromagnetic noise causing a signal level to change or a cosmic ray changing the state of one or more bits of memory. Reductions in the size of digital logic and memory elements, and reductions in the voltage used to operate the memory, make such problems increasingly important to consider when designing computer systems.

Error management is therefore implemented in many computer systems, and is most typically embodied in a error checking bits such as a single parity bit per data byte that is operable to indicate when a single bit has changed state, or error correction codes (ECC) that can detect and often correct single-bit errors in memory systems. More advanced systems use multiple error correction bits to provide Single Error Correction/Multiple Error Detection capability, or SECDED, anticipating that multi-bit memory errors may continue to become more common as memory performance continues to push forward. Even though the reliability of individual digital logic chips and memory components is very high, the number of semiconductor devices in large multiprocessor computer systems and the cost involved with producing the digital logic and memory devices needed make error detection and correction an important consideration in large multiprocessor computer system design.

SUMMARY

One example embodiment of the invention comprises a multiprocessor computer system having a plurality of processors and a plurality of nodes, each node comprising one or more processors. A local memory in each of the plurality of nodes is coupled to the processors in each node, and a hardware firewall comprising a part of one or more of the nodes is operable to prevent a write from an unauthorized processor from writing to the local memory.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

Sophisticated computer systems often use more than one processor to perform a variety of tasks in parallel, and rely on the integrity of data spread across several processors, circuit boards, and computer enclosures to execute a single program. To keep costs under control, even very large multiprocessor computer systems often use commonly available processors, memory, and other components, very much like those found in personal computers and servers. But, as hundreds or thousands of commercial quality components are used to build a multiprocessor computer system, the chances of a component failure somewhere in the system become dramatically larger over a given time period than for a typical personal computer or server. One challenge facing designers of large parallel processing computer systems is therefore designing a large multiprocessor computer system of relatively unreliable parts that is itself relatively reliable.

Multiprocessors capable of scaling to kilo-processor count depend on deep submicron circuits for tightly integrated processor, memory, network and I/O functions. Ever-increasing improvements in semiconductor process technology have scaled minimum feature size below 100 nanometers allowing system designers to implement increasingly complex circuits and larger on-chip hardware data structures such as cache memories. Although improved semiconductor fabrication yield has reduced the extent of manufacturing defects or hard errors in the final silicon, these high-density, low-voltage devices have become increasingly susceptible to electrical influences from external factors such as natural radiation interference. Unlike design or manufacturing defects, the soft errors discussed here are the result of single-event upsets (SEUs) caused by high-energy particles that induce a charge which perturbs the state of a p-n junction in a CMOS circuit. The two most prevalent sources of SEUs are alpha particles that occur naturally from the radioactive decay of impurities in the packaging materials, or high-energy neutrons that evade the filtering effects of the earth's atmosphere to reach the surface. As logic circuits strive for ever-increasing frequencies, lower operating voltage, and smaller noise margins, it is projected that soft error rates will become unacceptable, ultimately being a principal obstacle for building multiprocessors that number in the thousands of compute nodes.

While a major focus here is towards particle-caused soft errors, there are also multiple ways for transient errors to happen. These include net-to-net noise coupling, noise coupled through a module's power system, pattern sensitive errors, marginal timing paths, and others, just to mention a few. The vast majority of these errors can mimic particle-caused soft errors, and the techniques that manage and contain them can be the same. Of course it is a focus of a system's engineering and design to avoid those errors in the first place.

The words fault and error are often used interchangeably, however, we make an important distinction between these terms which bears further elaboration. A fault is a software or hardware event which has the potential to affect the outcome of a user or kernel program. Only when a fault becomes program visible does it become an error. The semantics of fault and error will be carried through the remainder of this section. This point is not a philosophical one, but rather a matter of practicality. An application program must only be interrupted when a fault becomes program-visible, sparing the application from benign faults.

We take the position that RAS (reliability, availability, and serviceability) is fundamentally about six things: fault avoidance, fault detection, fault tolerance, fault containment, fault diagnosis, and fault recovery. A scalable multiprocessor is composed of several cooperating areas of functionality, often existing at very different layers of abstraction. These include various hardware subsystems, operating systems, high-level user applications, an external monitoring and management subsystem, and others. The design of a complete computer system entails a series of agreements about how these each must act to compute reliably. When any function doesn't live up to its part of the bargain, a fault occurs.

A scalable multiprocessor is typically composed of several cooperating areas of functionality, often existing at very different layers of abstraction. These include various hardware subsystems, operating systems, high-level user applications, an external monitoring and management subsystem, and others. The design of a complete computer system entails a series of agreements about how these each must act to compute reliably. When any function doesn't live up to its part of the bargain, a fault occurs. There are many dimensions to an effective fault management schema. We have identified six dimensions that are necessary steps toward building a reliable large-scale multiprocessor.

Fault avoidance: Early in the design process we identify the sources of expected faults so that we can provide hardware and software support to avoid some faults altogether, for example by providing deadlock-freedom in the cache coherence protocol and link-level packet retry.

Fault detection: When a fault occurs, it is critical that it be detected and reported as quickly as possible so that an exception handler can identify the offending process and attempt to recover from the fault. Not all faults will manifest as errors; for instance a single-bit error on a cache word will be automatically corrected. All faults, however, must be recorded for possible later inspection.

Fault tolerance: The hardware and software layers should strive to tolerate all faults. There are several possible ways of doing so, including: retrying hardware or software operations, degrading the performance of a component without affecting its basic functionality, and so forth.

Fault containment: When a fault manifests itself as an error, it becomes essential to limit the scope of that error to avoid propagating the error to other nodes in the system. This is often accomplished with a combination of hardware support as well as software techniques to stop the effects from the error from spreading.

Fault diagnosis: Identifying the faulty component and source of the error (e.g.: router 7, port 3, input buffer over-run). As part of the diagnosis we would like to establish if the error was transient, intermittent, or permanent. A transient fault will appear with uniform randomness. However, an intermittent error may correlate to a certain event (i.e. reading and decoding the contents of one register while the adjacent register is being written, as an example of simultaneous switching problems). A permanent failure is usually the result of a manufacturing defect such as an open or short circuit. To help determine the nature of the error, some error reports give a count value which is useful as classifying the error as transient, intermittent, or permanent.

Fault recovery or repair: After manifesting as an error and having been isolated to an affected node, a fault should be repaired or recovered as quickly as possible. As a corollary to this principle, we attempt to avoid repeating errors by restoring the hardware in a state which would possibly avoid the fault. For example, identifying a main memory address that has a faulty DRAM page could be avoided by having the system software map out the faulty page to avoid future references. In this way, faults that cannot be recovered or repaired we take it as another opportunity for fault avoidance. Similarly, if a single-bit memory error is persistent then we identify the faulty bit and might use spare-bit (redundancy) to effectively repair the error if that capability is available.

Some embodiments of the present invention seeks to remedy these and other problems by using a multi-tiered hardware architecture to handle errors at multiple points and layers within the system, including providing error correction code use on hardware elements including an outstanding request buffer in a processor node, a non-posted table, memory domain descriptor table data in the network address translation table, memory relocation table data, completion queue data, and atomic memory operation request buffer data.

Figure 1:
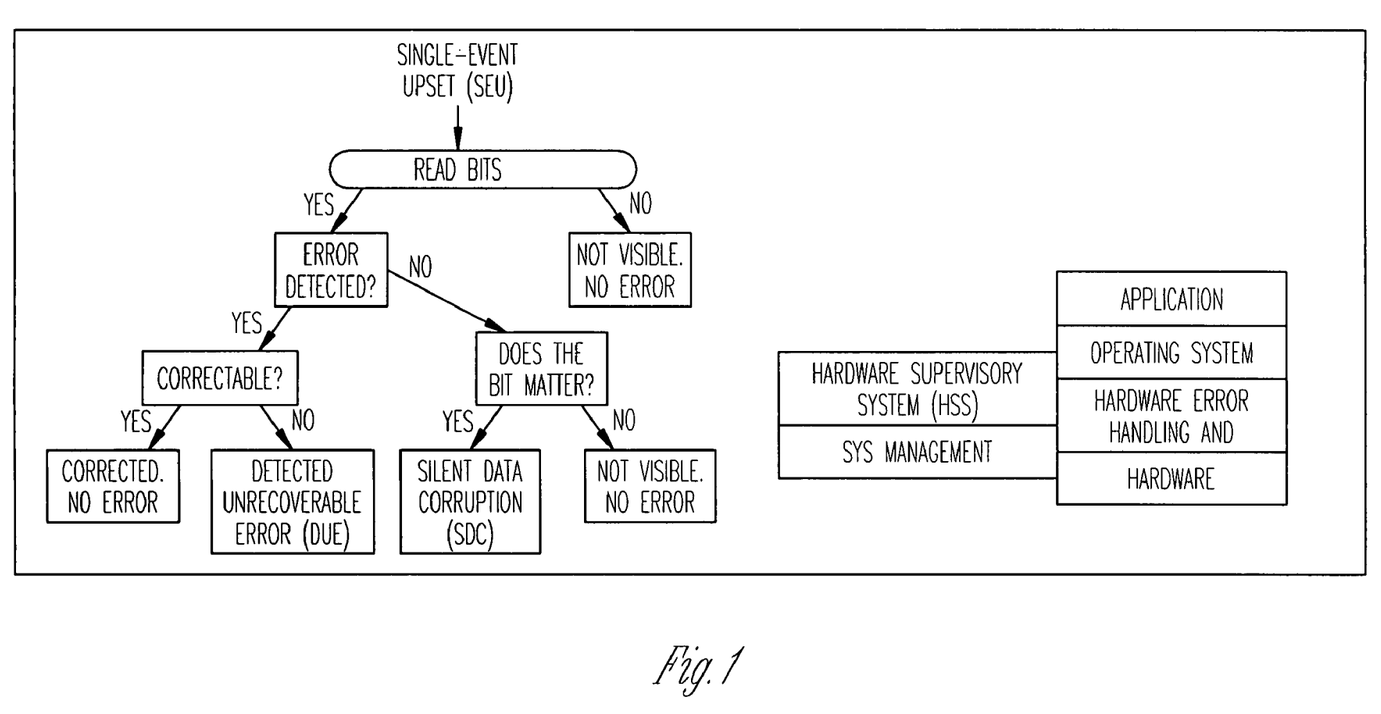
FIG. 1 shows an example error management flow diagram for a read operation of a memory structure, consistent with an example embodiment of the invention.

Many of these elements are communication protocol structures that incorporate ECC error handling code technology to ensure that the protocol itself is operable to identify and recover from certain errors. Similarly, parity protection is used in other structures including source-side synchronization identifier block data, received message table entry data, FMA and BTA descriptors, and hypertransport virtual cave buffers. Parity enables fault awareness in the protocols described here, including reporting faults to the applications so that they can be managed on a large scale. User level applications can take advantage of the underlying error detection and reporting to build massively scalable applications while managing hardware reliability, allowing software applications to deal with errors as the application In a more detailed example, a multi-faceted approach to system reliability is used. In this example, a combined hardware-software approach spans multiple levels of abstraction within the system design. FIG. 1 shows an example flow diagram for a read operation of a memory structure (could be DRAM main memory, or a register file, or SRAM data structure within the ASIC, for example), consistent with an example embodiment of the invention. Not all errors are program-visible—which would result in a program error if the error was not corrected or handled as illustrated in FIG. 1.

The underlying hardware, and the error handling hardware is desirably able to detect, recover from, and contain errors. This is achieved using a tightly-coupled interaction between the hardware supervisory system (HSS) and the underlying hardware. Global memory operations (Get/Put/AMO operations across the network) can be classified into transactions that occur:

Source—the processor element or node that generated the request

Network (router)—the path of routers that are traversed from source to destination, and Destination—the target processing element that will read/write to its memory region.

Figure 2:
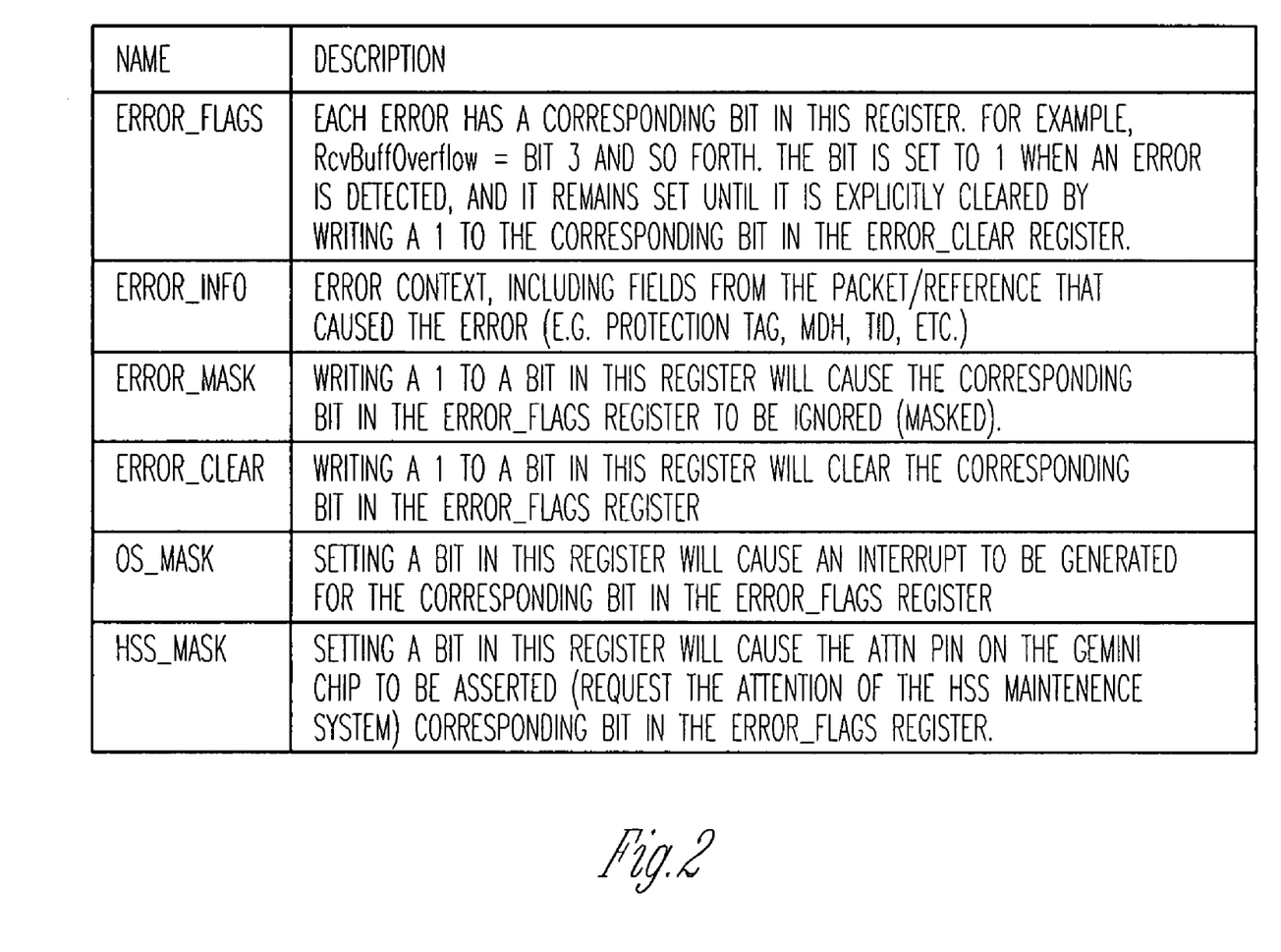
FIG. 2 illustrates a set of error management memory-mapped registers, consistent with some embodiments of the invention.

Error designations are divided into one of these three areas, and encoded using a common interface via memory-mapped registers (MMRs), such as the six registers as shown in FIG. 2, which illustrates a set of memory-mapped registers consistent with an example embodiment of the invention. The ERROR_FLAGS register enumerates all the errors that can be detected by a specific chip, or portion of a chip, such as the network interface portion of a multiprocessor control chip for example. When an error is detected, the bit corresponding to that specific error is set to a 1 in the ERROR_FLAGS register. Upon error detection, the error handling hardware will check the bit position in the ERROR_MASK register to determine if that error is enabled or masked. If the error is masked, then the error is ignored. Otherwise, the error handling hardware will capture contextual information about the error in the ERROR_INFO register. Then, it will compare the OS_MASK and HSS_MASK registers to determine where the exception should be asserted. If the OS_MASK bit corresponding to the bit in the ERROR_FLAGS register is set, then an interrupt request is sent to the attached processor. If the HSS_MASK bit corresponding to ERROR_FLAGS register is set, it will assert a top-level attention (ATTN) pin on the chip to request the attention of the HSS controller.

A variety of error types are possible in a multiprocessor system, and categorization of such errors in this example helps illustrate how various errors are managed. For errors that occur in the source node or processor node that is sending data to another node, errors are typically managed in the sending node. As outgoing memory references are generated, they will undergo logical-to-physical node translation via the node translation table (NTT). The NTT is a direct-mapped data structure that allows a logical node number to be arbitrarily renumbered to a physical node number. During this translation, it is possible for one of the entries to be corrupt, resulting in an unrecoverable NTT error. In this case, the packet is discarded, the ERROR_FLAGS bit is set, and the ERROR_INFO register captures the index into the NTT that experienced the error.

Each outgoing remote memory operation will make an entry in the outstanding request buffer (ORB). Each entry in the ORB is dynamically allocated when the request is created, and assigns a unique packet identifier (PacketID) that travels in the request packet header. This PacketID is echoed in the response packet when the reply is generated, so that when the response returns to the originator, the PacketID is used to directly index into the ORB and retrieve control information about the request. Each entry of the ORB has a watchdog timer associated with it, and if the response does not return within the specified timeout period, an exception is raised. The operating system will interrogate the ORB to determine which index timed out, and try to identify the application associated with the request, so that the application can either recovery gracefully with a checkpoint/restart mechanism, or application can be terminated without corrupting other processes (containment). The ORB can also detect an unexpected response packet—that is, a reply for which there is no outstanding request. In that case, it was most likely the result of a misrouted packet in the network, or the ORB timeout value was set too low.

Errors that occur in the network are handled differently, as the source, destination, and intermediate nodes may be involved. As a packet traverses the network visiting intermediate routers, it may incur an uncorrectable error. The interconnection network can be viewed as a graph with vertices (routers) and edges (links) connecting them. If a router fails, it will appear as though all the links attached to that router have failed. Link failure is detected via the link active signal on both sides of the physical channel.

Output port inactive—a link failure will remove the edge connecting two adjacent router nodes. When a link fails, any packets that are destined to the failed link will be discarded when they reach the output tile connected to the failed link. The routing algorithm within the Gemini router tiles does not know ahead of time if the target output port will be active at the time the packet routing decision is made. Thus, when a link fails, software must re-program the routing table to remove the faulty output port from the set of allowable outputs. By avoiding the faulty link, we will prevent subsequent packets from being discarded and contain the fault to a subset of messages and/or effected applications. When a port is inactive, the router discards packets destined to the failed port, and asserts an error to get the attention of HSS.

Corrupt packet—the router tiles use the packet CRC to detect bit-flips that occur in the internal buffers of the router tile. If a packet is corrupted, the end-of-packet (EOP) phit is marked as "bad, will not retry" and will be discarded at the destination endpoint. Since the packet is corrupted, none of the fields of the packet will be trusted and therefore the most reasonable action is to discard the packet and signal an error indicating that a bad packet was received.

Buffer overflow—the router tile has a 256 entry input buffer, of which 192 credits are made available to the sender and two max-sized packets are reserved for corner cases. Within the router tiles, a packet will flow from the input buffer to the row buffers (in front of the 8×8 subswitch xbar) and then finally to the column buffer at the output tile. Although it is very unlikely, it is possible for the row or column buffers to overflow.

Errors at the receiving node are often handled within the receiving node, but can involve communication with other nodes. When a request reaches the target node, it must undergo remote address translation. The address translation pipeline contains several stages through which the request must travel before it is injected into the HyperTransport (HT) fabric. Once the request makes it through this gauntlet, it is deemed valid and a response packet is generated with "normal completion" status (status=0000). There are, however, several types of errors that can occur between the time in which the packet is received and the time it is injected into the HT fabric. Error! Reference source not found. summarizes the error types and their corresponding response status.

Mis-routed packets—All incoming packets into the NetLink will be checked against the NodeID[15:0] register to ensure properly delivery. If the Destination[15:0]≠XNodeID[15:0] then the status field is set to status=0001 and the packet is sent through the address translation pipeline.

Uncorrectable error—There are several conditions that cause an uncorrectable errors:

Data error on read for Get—a Get operation may have a data response error in the HT packet indicating a main memory error.

Data error on AMO—the read portion of an AMO (read-modify-write) could return a data error on the HT link. In which case, the AMO is aborted, and the AMOResponse returns a status=0010

Data error on write—Any write operation that is smaller than a cache line (the minimum granularity of the NB memory controller is 64 bytes) will result in a read-modify-write to that location. So, it is possible to get an uncorrectable memory error on a write. A multi-bit error in main memory on a write to a byte or double-word, for example, will require a read-mod-write operation will immediately generate a machine check.

Invalid command—The Gemini chip interoperates with the Scorpio chip and shares a common network format. However, there are some operations that are specific to Scorpio (e.g. load and store operations using extended memory semantics). An invalid command in the incoming request will generate a response packet with status=0011.

Malformed packet—Gemini request packets are checked to ensure the request is valid. For example, an atomic memory operation (AMO) has the correct number of operands, or the mask field has contiguous bits set. Any malformed packet will not be acted upon, and will generate a response packet with status=0100.

Multi-bit error or invalid entry in translation table—if a double-bit error is detected during the lookup of the MDH, or MRT index, we must abort the operation and return the appropriate status.

Protection tag mismatch—The incoming network packet is authenticated by checking the protection tag against the PTAG field in the memory domain descriptor table entry. Any request packet with a PTAG violation must not be acted upon, and the response packet is returned with status=1000.

Memory bounds error—Failed the base+limit check. Return response with status=1001.

Write permission error—Each physical page is marked with a permission bit to prevent read-only pages from being written. Any write operation requires writable permission on the page in the MRT, or the request is not acted upon and a response is returned with status=1010

Figure 3:
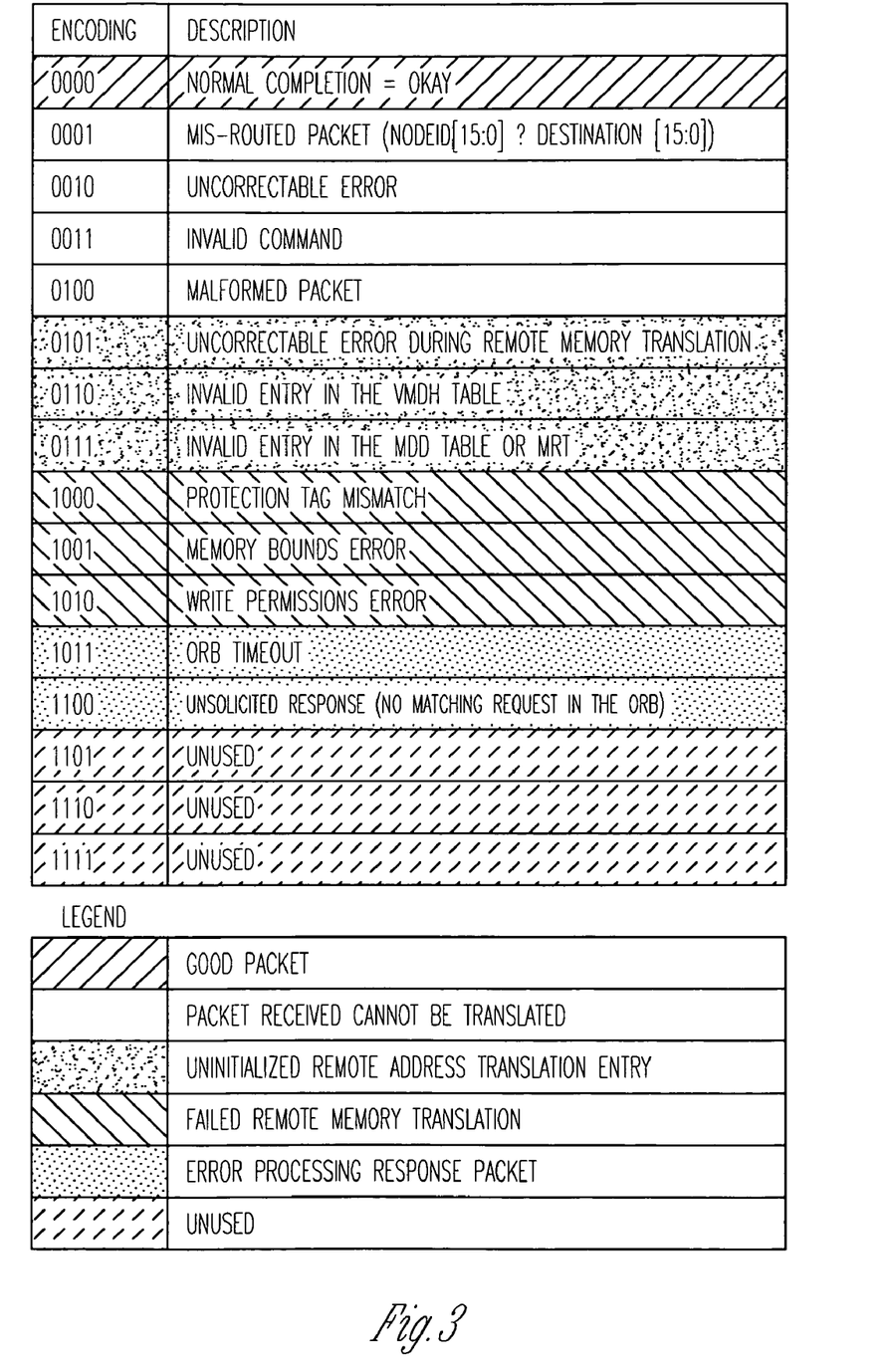
FIG. 3 is a table illustrating encoding of a response packet status field as is used in an example embodiment of the invention.

FIG. 3 summarizes the encoding of the response packet status field. The status field is checked on the response packet header to determine if the destination node incurred an error. By segregating errors out into three different classes: (i) source, (ii) network, and (iii) destination node, the system software can interrogate the correct nodes to determine the best approach for recovery or error mitigation.

Figure 4:
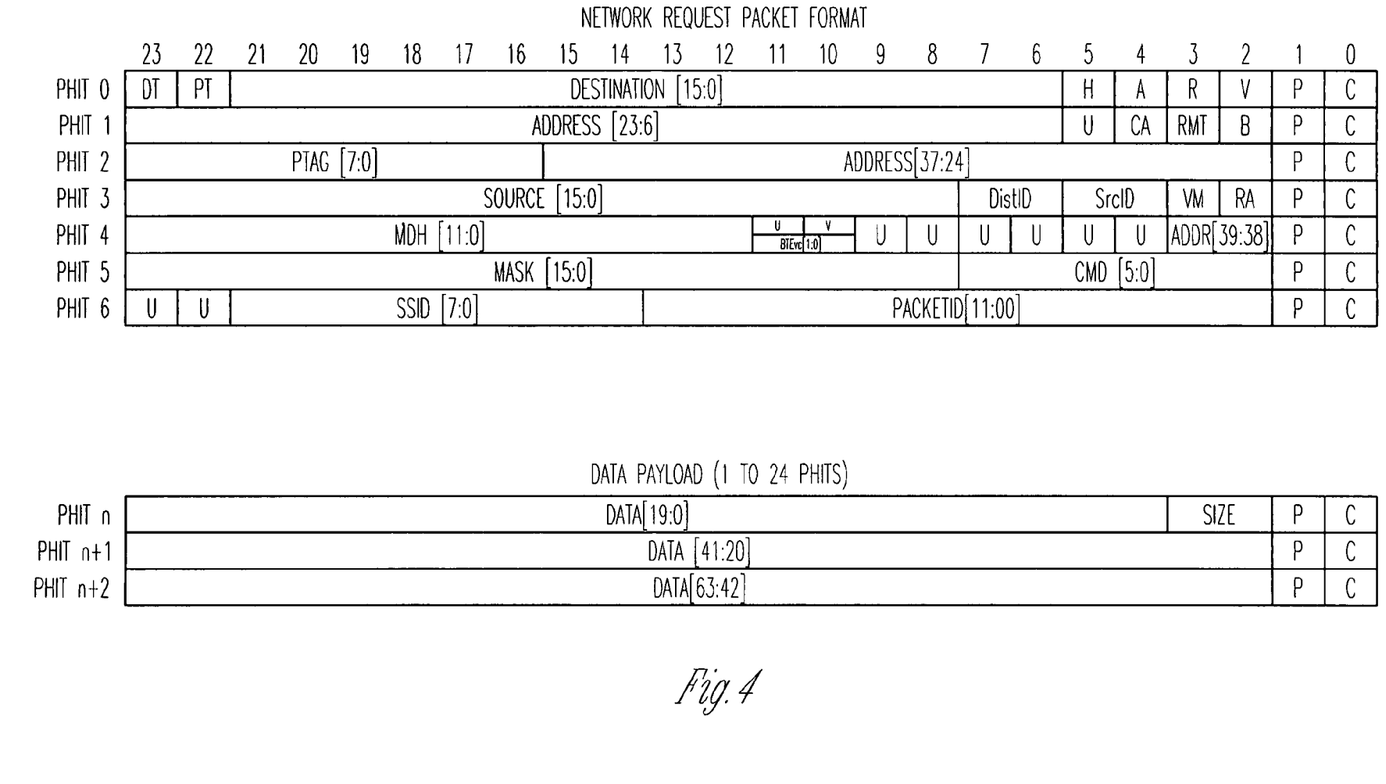
FIG. 4 illustrates the format of network request packets received over a processor communications network, consistent with an example embodiment of the invention.
Figure 5:
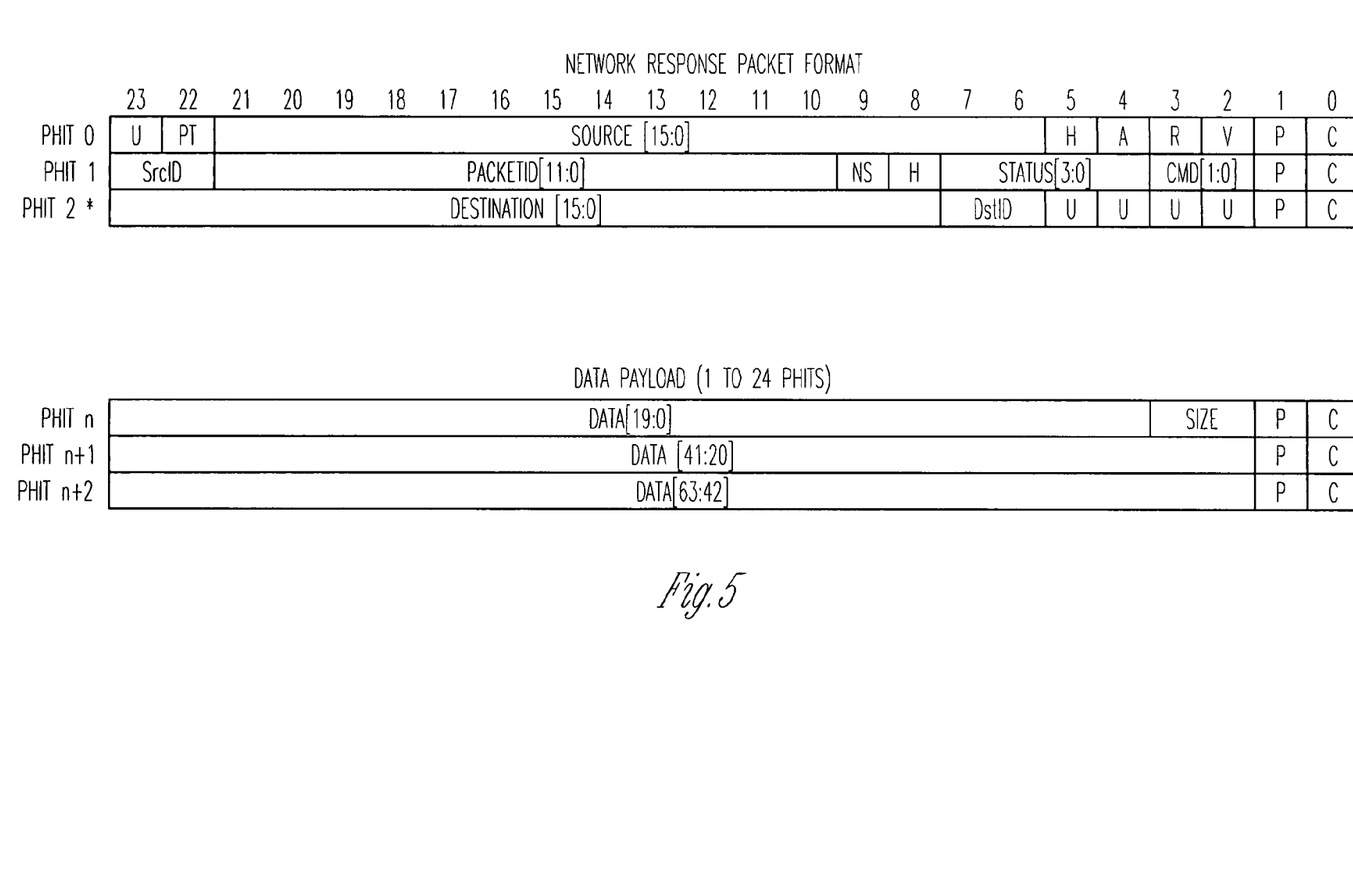
FIG. 5 illustrates the format of response packets sent in reply over the processor communications network, consistent with an example embodiment of the invention.

FIG. 4 illustrates the format of packets received over a processor communications network, consistent with the example embodiment of the invention described above, while response packets consistent with the same example are illustrated in FIG. 5. If an error is detected at the destination, the response header contains an additional phit (phit 2 of FIG. 4) that encodes which processing element {destination[15:0], DstID[1:0]} where the error occurred. This allows software to know which node to interrogate upon receipt of the error response packet. In this example, the 3-phit response header is only for error responses, and normal responses will only use a 2-phit response header.

Various hardware structures will also use various error management methods, such as error correction codes (ECC) or parity to detect or correct errors. Data structures that are architecturally vulnerable desirably provide a form of strong protection. The outstanding request buffer (ORB) that must tolerate round-trip network latency is in this example therefore protected with ECC. The node translation table (NTT) is written at job launch, and is read on every packet that is sent. So, the data in the NTT has a long "lifetime" between when it is written and when it is consumed. Consequently, the NTT is desirably strong protected with ECC as well. The non-posted table (NPT) tolerates round-trip latency across the HT port and local memory access (about 150 ns of total latency). The entries in the NPT are vulnerable to bit-flips during the local memory access and all the bits in the NPT are highly vulnerable—if any bit is upset, it will likely manifest as an application-visible error.

On the other hand, there are large structures that in some embodiments may not require such strong protection. As an example, the receive message table (RMT) would not necessarily need ECC, since it is primarily a performance optimization. If an RMT entry took a parity error, we could just declare the entry as invalid and the message would incur an additional round-trip network latency to complete the message, without permanent data loss or corruption occurring as a result. Another example of a large hardware structure that is not architecturally vulnerable is the LCB send buffer. Although the send buffer must tolerate a chip-to-chip latency, the contents of the send buffer are very unlikely to be used again—only if a transmission error occurs. So, it would be sufficient to provide parity or not to protect the LCB send buffer. Other descriptors such as BTE and FMA descriptors are parity protected in this example, since the data in the descriptor can have a relatively long lifetime. Also, if FIFOs are made from SRAM cells, we should consider parity protection on FIFOs in the HT cave, FMA and BTE.

In summary, error detection and recovery is an important consideration in building robust, scalable multiprocessor systems. The examples presented here provide ECC protection on the following hardware structures:
  outstanding request buffer (ORB)
  non-posted Table (NPT)
  memory domain descriptor (MDD) table in the network address translation (NAT) block
  memory relocation table (MRT) in the remote address translation block
  completion queue (CQ) descriptors
  request buffer used for atomic memory operations (AMOs)
Other structures are parity protected:
  source-side synchronization identifier (SSID) block
  receive message table (RMT)
  FMA and BTE descriptors
  HyperTransport (HT) cave virtual channel buffers By incorporating error detection and handling into the communication protocol, the status of a transaction can be passed back to the software stack to enable fault aware applications at large scale. User-level applications can thereby take advantage of the underlying error detection and reporting to build massively scalable applications. The MsgComplete packet can be used to indicate success or failure in the completion event. This allows the upper-level software layers to deal with user-level errors in the least intrusive manner.

This example approach has multiple advantages, including in various embodiments:
  Detection at multiple locations within the systems: source, router, and destination
  Fault containment by recovering architectural state when possible, and preventing the error from cascading to other processor elements
  Identify the source of the error as either "user" or "kernel" and only terminating the application (not crashing the system) upon error detection
  Hardware structures that tolerate network latency (ORB) have watchdog timeout mechanism to detect a lost packet in the network.
  Hardware structures that tolerate local memory latency (NPT) have watchdog timeout mechanism to prevent lost memory reference to local memory (e.g. as a result of a bad memory controller or processor)
  Timeout mechanism on network egress ports to detect a hung processor. When a processor stops responding to requests, we must discard all network traffic destined to that processor to avoid tree saturation in the network, and interfering with communication flows from other applications.
  Self-cleaning data paths which detect a lack-of-forward-progress and will purge any blocked traffic allowing the HSS (maintenance controller) to issue read/write operations to ERROR_INFO and ERROR_FLAGS registers to perform a post-mortem failure analysis. Even for fatal errors, the operating system may be able to interrogate the hardware to determine the root cause and take preventive measures to ensure the error is not recurring.
  Response packets that indicate an error will contain an additional phit of information that is used at the source to indicate which destination node incurred the error. Normal response packets will not contain this additional information, since it is not useful for packet processing.

Further, hardware firewalls are used in some embodiments of the invention to prevent errant writes from corrupting the system state, such as where misrouted, malformed, or other erroneous network packets may erroneously modify a receiving node's memory. The operating system configures two hardware tables to set up the firewall. The first table is a node group table, which identifies a set of nodes that heave permission to transmit to the receiving node. The second table is a memory group table, which identifies the set of memory pages that are accessible to network writes. This multi-level hardware firewall protection provides an authentication scheme that in some environments can significantly reduce the probability of receiving corrupted writes in a node in a multiprocessor system.

Figure 6:
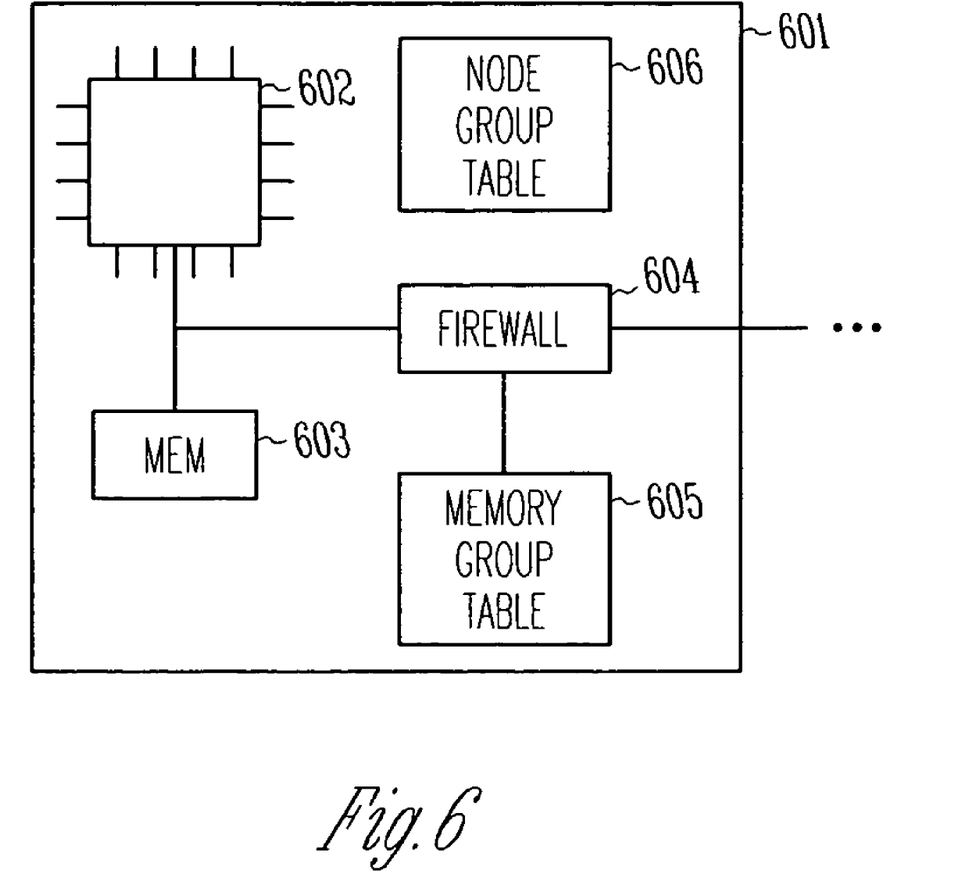
FIG. 6 shows a block diagram of a multiprocessor computer system node employing a hardware firewall operable to prevent errant writes to the node's memory, consistent with an example embodiment of the invention.

In a further example, all incoming memory write requests to a node are filtered through a hardware node firewall, as is shown in FIG. 6. FIG. 6 shows a block diagram of a multiprocessor computer system node employing a hardware firewall operable to prevent errant writes to the node's memory, consistent with an example embodiment of the invention. The node 601 comprises a processor 602 and a memory 603, as well as a hardware firewall 604. Incoming messages that write to either the memory 603 or to memory-mapped registers are routed through the hardware firewall 604, and the authenticity of the write request is verified before the data is written to memory. Reads are not protected by the firewall, as errant reads do not have the same consequences of corrupted data as errant writes.

Here, each 64 Megabyte page of physical memory in node 601 belongs to one of six possible groups, and a memory group table 605 having 8192 entries to cover all the physical memory pages in this node ensures that any write request is to a memory group that is available for network writes from the writing node, and is not local memory such as kernel memory or local processor memory that is not writable to other nodes. The request is therefore made after address translation, as physical addresses are used to verify permission to access the given memory region using the node group table.

A node group table 606 is further employed to ensure that only nodes that are authorized to write to node 601's memory can perform write operations. For example, in a 1024 node system, a program executing on only 16 of the nodes may be configured by the operating system such that only the 15 other nodes executing the same program can write to the memory in node 601, thereby preventing errant writes from the other 1008 nodes in the system. In a further embodiment, the memory in node 601 is segmented, and different memory segments used for different purposes can be authorized separately from other memory segments to accept memory writes from various nodes or groups of nodes. In alternate embodiments, only one of the two tables is used in the node firewall, either alone or with other features.

Figure 7:
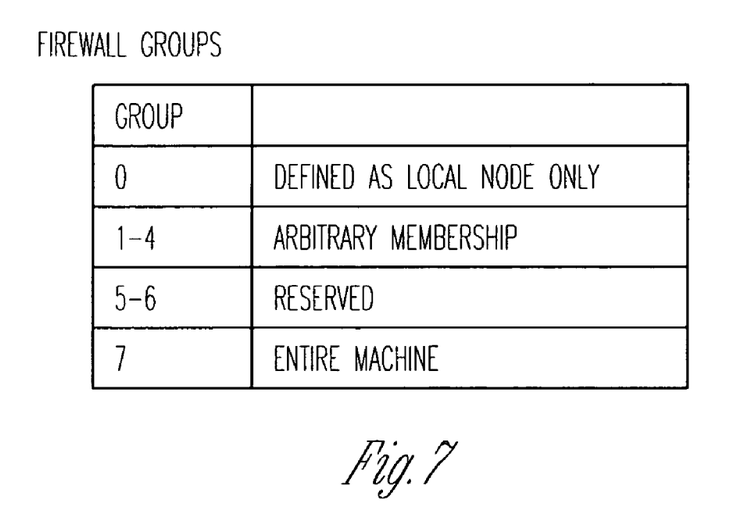
FIG. 7 is a table illustrating processor groupings, consistent with an example embodiment of the invention.

Example node group table groupings are shown in FIG. 7, which illustrates seven different node descriptors that can be assigned to each page of memory local to the node. For example, a page having a descriptor of 0 is a local page, and can only be written by a processor local to the node. Similarly, a page having a descriptor of group 7 can be written by any node in the machine, and is not protected.

Figure 8:
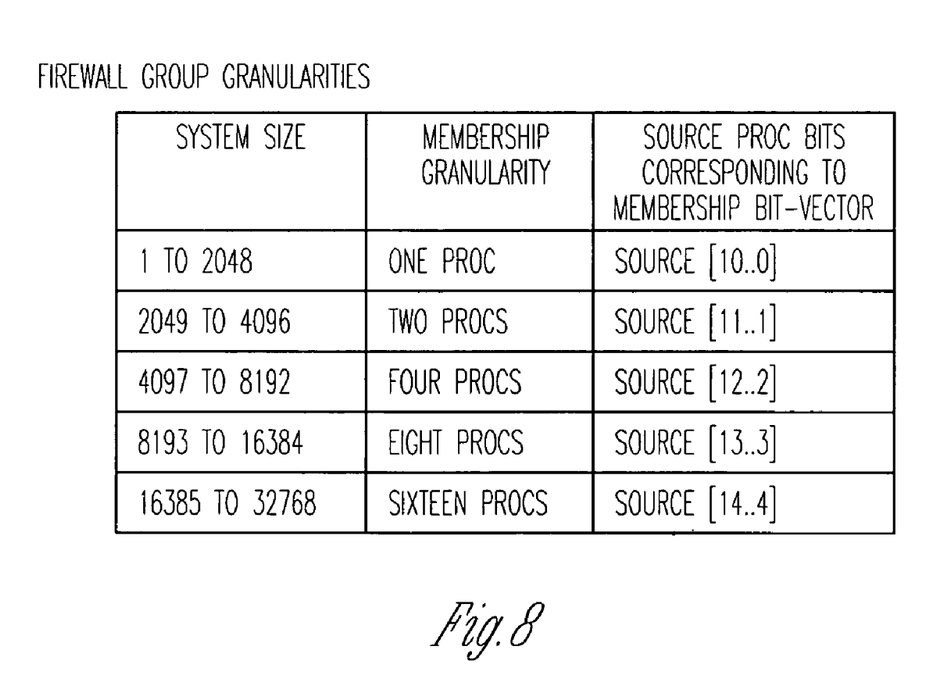
FIG. 8 is a table illustrating processor group vector granularity, consistent with an example embodiment of the invention.

Each of the remaining groups 1-4 are defined by a 2048 bit vector in which each bit represents one processor for systems having 2048 or fewer nodes. For example, group 1 may include 64 processors running a specific program, identified by the corresponding 64 bits of the group's membership vector being set to "one". For systems having more than 2048 processors, the granularity of processor groupings identified by each bit in the vector is greater than one processor per bit, as is reflected in FIG. 8. In this example, assigning up to 16 processors per bit enables identification of all of the processors in systems up to 32,768 processors using the 2048-bit processor group vector.

This construct enables a memory write request from a remote node to be verified as coming from a processor or node that is part of a group of processors or nodes authorized to write to the page of memory. This enables authorized processors running the same program to exchange and transfer data, while preventing processors running other programs from accidentally overwriting memory locations in pages not assigned to their programs.

Some elements of the embodiments described above include various modules that comprise hardware, software, manual intervention, and various combinations thereof. Such modules will also include other elements, functions, or methods in further embodiments, all of which are within the scope of the pending claims. Various computerized systems, computer elements such as processors, machine-readable media, and other elements are also described, and include various combinations of elements and modules as described above. For example, a computerized system includes in various embodiments multiple processors or processors with multiple cores, modules or functions involving manual intervention, and other elements such as physical interfaces.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A multiprocessor computer system, comprising:
a plurality of processors;
a plurality of nodes, each node comprising one or more processors;
a local memory in each of the plurality of nodes, the memory coupled to the processors in each node; and
a hardware firewall comprising a part of one or more of the nodes, the firewall operable to prevent a write from an unauthorized processor from writing to the local memory; wherein a processor group table identifies a group of processors that have permission to write to the local memory.

2. The multiprocessor computer system of claim 1, wherein the local memory comprises a plurality of memory pages, and the hardware firewall is further operable to prevent a write from a processor not authorized to write to a page identified in the write request.

3. The multiprocessor computer system of claim 1, wherein the processor group table comprises a processor bit vector for each group, identifying the processors that are members of the group.

4. The multiprocessor computer system of claim 3, wherein one or more bits of the processor bit vector identifies one or more nodes or processors in the multiprocessor computer system.

5. The multiprocessor computer system of claim 4, wherein the processor group table comprises a node group table, each entry comprising one or more nodes that have permission to write to the local memory, each node comprising one or more processors.

6. A method of preventing errors in a multiprocessor computer system, comprising:
a hardware firewall comprising a part of one or more nodes in the multiprocessor computer, each node comprising one or more processors, the firewall operable to prevent a write from an unauthorized processor from writing to a local memory in the node; and further comprising using a processor group table to identify a group of processors that have permission to write to the local memory.

7. The method of preventing errors in a multiprocessor computer system of claim 6, wherein the local memory comprises a plurality of memory pages, and the hardware firewall is further operable to prevent a write from a processor not authorized to write to a page identified in the write request.

8. The method of preventing errors in a multiprocessor computer system of claim 6, wherein the processor group table comprises a processor bit vector for each group, identifying the processors that are members of the group.

9. The method of preventing errors in a multiprocessor computer system of claim 8, wherein one or more bits of the processor bit vector identifies one or more nodes or processors in the multiprocessor computer system.

10. The method of preventing errors in a multiprocessor computer system of claim 9, wherein the processor group table comprises a node group table, each entry comprising one or more nodes that have permission to write to the local memory, each node comprising one or more processors.

11. A computer processing node, comprising:
one or more local processors;
a connection to one or more other processing nodes;
a local memory coupled to the one or more local processors; and
a hardware firewall operable to prevent a write from an unauthorized processor from writing to the local memory; wherein a processor group table identifies a group of processors that have permission to write to the local memory.

12. The computer processing node claim 11, wherein the local memory comprises a plurality of memory pages, and the hardware firewall is further operable to prevent a write from a processor not authorized to write to a page identified in the write request.

13. The computer processing node of claim 11, wherein the processor group table comprises a processor bit vector for each group, identifying the processors that are members of the group.

14. The computer processing node of claim 13 wherein one or more bits of the processor bit vector identifies one or more nodes or processors in the multiprocessor computer system.

15. The computer processing node of claim 14, wherein the processor group table comprises a node group table, each entry comprising one or more nodes that have permission to write to the local memory, each node comprising one or more processors.

* * * * *